(12) United States Patent
Uenaka

(10) Patent No.: US 8,212,881 B2
(45) Date of Patent: Jul. 3, 2012

(54) DRIVE DEVICE

(75) Inventor: Yukio Uenaka, Tokyo (JP)

(73) Assignee: PENTAX Ricoh Imaging Company, Ltd., Tokyo (JP)

( * ) Notice: Subject to any disclaimer, the term of this patent is extended or adjusted under 35 U.S.C. 154(b) by 634 days.

(21) Appl. No.: 12/334,843

(22) Filed: Dec. 15, 2008

(65) Prior Publication Data

US 2009/0151095 A1 Jun. 18, 2009

(30) Foreign Application Priority Data

Dec. 18, 2007 (JP) ................................. 2007-326270

(51) Int. Cl.
*H04N 3/16* (2006.01)
*H04N 5/257* (2006.01)

(52) U.S. Cl. ...................... 348/208.99; 396/55

(58) Field of Classification Search ............... 15/91, 94; 396/52–55; 348/208.99, 208.1, 208.2, 208.3, 348/208.7, 208.8, 373
See application file for complete search history.

(56) References Cited

U.S. PATENT DOCUMENTS

| | | | | |
|---|---|---|---|---|
| 7,437,064 B2 * | 10/2008 | Seo | ................................. | 396/75 |
| 7,742,076 B2 * | 6/2010 | Seo et al. | ................. | 348/208.99 |
| 7,903,167 B2 * | 3/2011 | Uenaka et al. | ................. | 348/340 |
| 7,903,959 B2 * | 3/2011 | Uenaka | ........................... | 396/55 |
| 8,064,760 B2 * | 11/2011 | Uenaka | ........................... | 396/55 |
| 2005/0264656 A1 * | 12/2005 | Seo et al. | ................... | 348/219.1 |
| 2008/0037980 A1 * | 2/2008 | Okumura et al. | ............ | 396/535 |
| 2008/0084479 A1 | 4/2008 | Uenaka | | |
| 2008/0084492 A1 | 4/2008 | Uenaka et al. | | |
| 2008/0084505 A1 * | 4/2008 | Uenaka | ........................ | 348/616 |
| 2008/0084608 A1 * | 4/2008 | Uenaka | ........................ | 359/507 |

FOREIGN PATENT DOCUMENTS

| | | |
|---|---|---|
| JP | 2005-340988 | 12/2005 |
| JP | 2005-340990 | 12/2005 |

OTHER PUBLICATIONS

China Office action, dated Jun. 30, 2011 along with an english translation thereof.
Japan Office action, dated Oct. 18, 2011 along with an english translation thereof.

* cited by examiner

*Primary Examiner* — Aung S Moe
(74) *Attorney, Agent, or Firm* — Greenblum & Bernstein, P.L.C.

(57) ABSTRACT

A drive device is provided having a movable part, a fixed part, a drive part, and a direction-detecting part. The fixed part is provided within a movement range of the movable part. The drive part drives the movable part in a first direction against the fixed part. The direction-detecting part detects the bound direction of the movable part after the movable part strikes the fixed part. The drive part drives the movable part so as to strike the fixed part according to the bound direction detected by the direction-detecting part after the movable part strikes the fixed part.

19 Claims, 6 Drawing Sheets

DRIVE DEVICE

BACKGROUND OF THE INVENTION

1. Field of the Invention

The present invention relates to a drive device that drives a movable part on which, for example, an image sensor of a camera is attached.

2. Description of the Related Art

A device which is provided in a photographing device such as a digital camera and removes dust particles attached to the camera's image sensor and its cover is proposed.

United States Published Patent Application Publication Number 2005-0264656 A discloses a device which strikes a movable part against a fixed part so as to remove dust particles attached to an image sensor and its cover by the impact of the strike.

However, the impact of simply striking a movable part against a fixed part is not always enough to remove dust particles. In some cases, dust particles may remain attached to the image sensor or its cover.

SUMMARY OF THE INVENTION

An object of the present invention is to provide a drive device capable of effectively removing dust particles.

A drive device is provided having a movable part, a fixed part, a drive part, and a direction-detecting part. The fixed part is provided within a movement range of the movable part. The drive part drives the movable part in a first direction against the fixed part. The direction-detecting part detects the bound direction of the movable part after the movable part strikes the fixed part. The drive part drives the movable part so as to strike the fixed part according to the bound direction detected by the direction-detecting part after the movable part strikes the fixed part.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
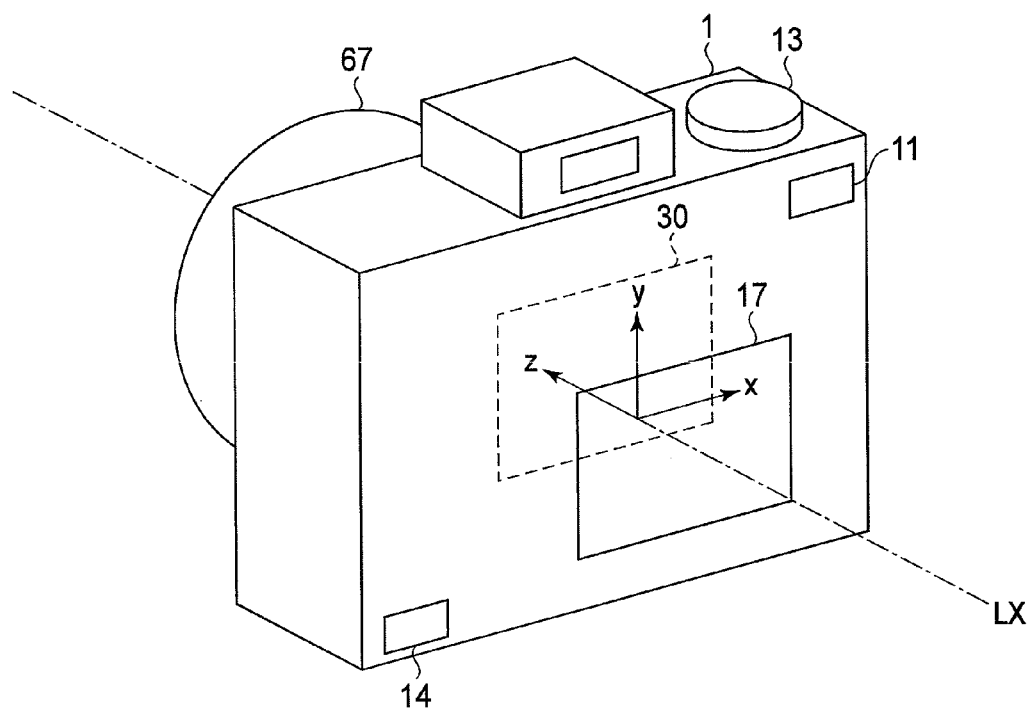
FIG. 1 is a perspective view of the image-capturing device according to the embodiment of the present invention.

The present invention is described below with reference to the embodiment shown in the drawings. In this embodiment, the photographing apparatus 1 is an image-capturing device in the form of a digital camera. A photographing optical system, such as a camera lens 67 etc., that captures an optical image on a photographing surface of the image sensor of the photographing apparatus 1 has an optical axis LX. In order to explain the orientation of the embodiment, an x-direction (the first direction), a y-direction (the second direction), and a z-direction are defined (refer to FIG. 1). The x-direction is in the horizontal plane and perpendicular to the optical axis LX. The y-direction is perpendicular to the optical axis LX and the x-direction. The z-direction is parallel to the optical axis LX and perpendicular to both the x-direction and the y-direction.

Figure 2:
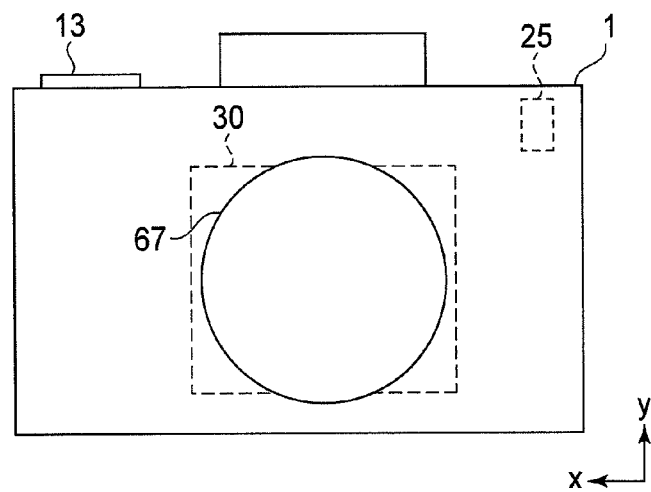
FIG. 2 is a front view of the image-capturing device.
Figure 3:
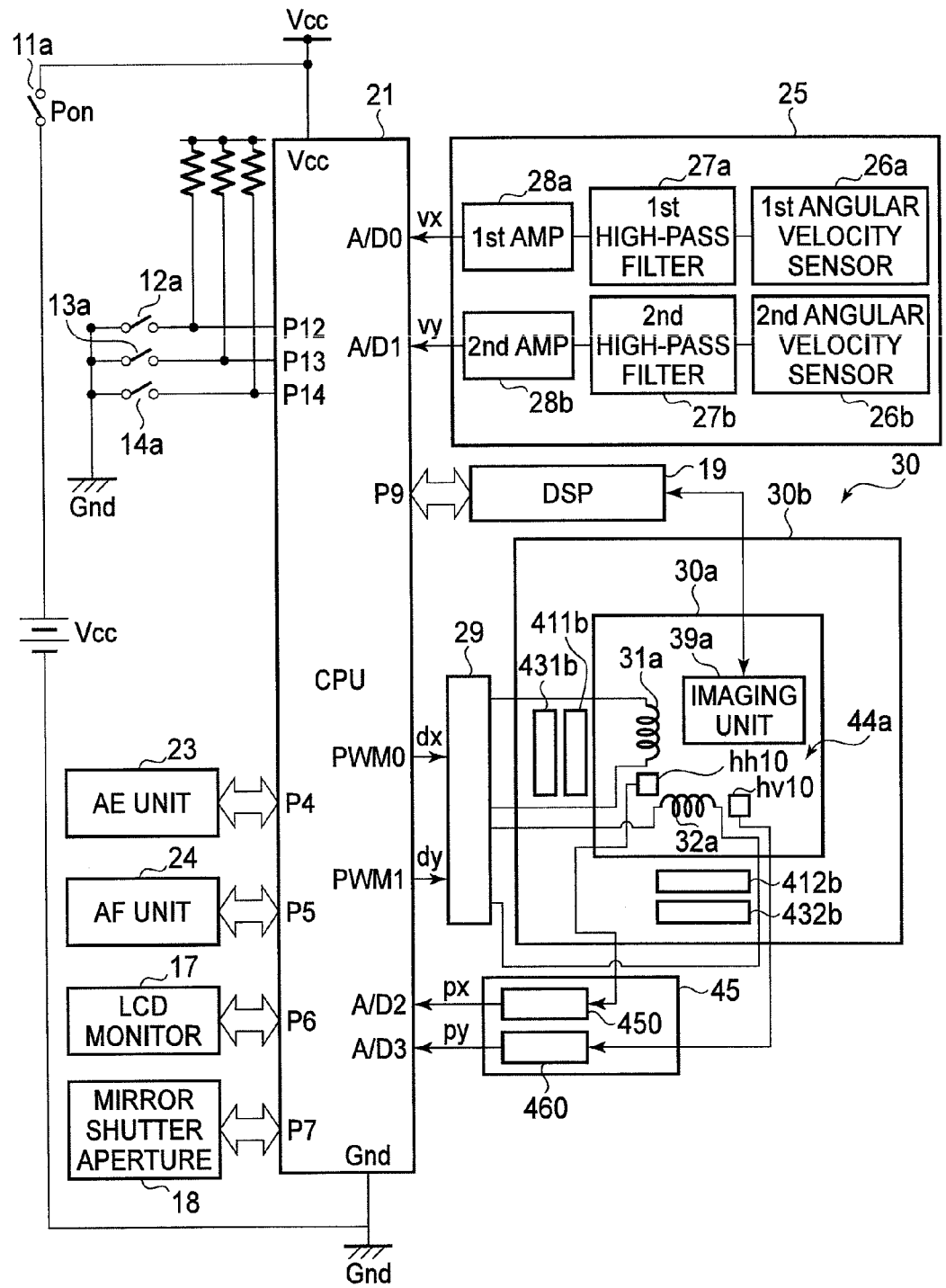
FIG. 3 is a block diagram of the image-capturing device.

The imaging and dust-removal part (the dust-removal apparatus) of the photographing apparatus 1 comprises a power button 11, a power switch 11a, a photometric switch 12a, a release button 13, a release switch 13a, an anti-shake button 14, an anti-shake switch 14a, an LCD monitor 17, a mirror-aperture-shutter unit 18, a DSP 19, a CPU 21, an AE (automatic exposure) unit 23, an AF (automatic focus) unit 24, an anti-shake unit 30, and a camera lens 67 (refer to FIGS. 1, 2, and 3).

The anti-shake unit 30 comprises a movable part 30a and a fixed part 30b. The movable part 30a is a rectangular and a flat plate. The fixed part 30b is a rectangular frame which has a rectangular hole. The movable part 30a is provided in the rectangular hole. In other words, the movable part 30a is surrounded by the fixed part 30b.

Whether the power switch 11a is in the ON state or the OFF state is determined by the state of the power button 11, so that the ON/OFF states of the photographing apparatus 1 correspond to the ON/OFF states of the power switch 11a. The photographic subject image is captured as the optical image through the camera lens 67 by the imaging unit 39a, and the captured image is displayed on the LCD monitor 17. The photographic subject image can be observed through the optical finder (not depicted).

After the power button 11 is depressed, putting the photographing apparatus 1 in the ON state, a dust-removal operation is performed in a first time period (220 ms).

When the release button 13 is partially depressed by the operator, the photometric switch 12a changes to the ON state so that the photometric operation, the AF-sensing operation, and the focusing operation are performed. When the release button 13 is fully depressed by the operator, the release switch 13a changes to the ON state so that the imaging operation by the imaging unit 39a (the imaging apparatus) is performed, and the image is captured and stored.

The mirror-aperture-shutter unit 18 is connected to port P7 of the CPU 21 and performs an UP/DOWN operation of the mirror (a mirror-up operation and a mirror-down operation), an OPEN/CLOSE operation of the aperture, and an OPEN/CLOSE operation of the shutter according to the ON state of the release switch 13a.

The DSP 19 is connected to the imaging unit 39, and port P9 of the CPU 21. Based on a command from the CPU 21, the DSP 19 performs calculation operations such as the image processing, etc., on the image signal obtained by the imaging operation of the imaging unit 39a.

The CPU 21 is a control apparatus that controls each part of the photographing apparatus 1 regarding the imaging operation, the dust-removal operation, and the anti-shake operation (i.e., the image stabilizing operation). The anti-shake operation includes both the movement of the movable part 30a and a position-detection operation. Furthermore, the CPU 21 stores the value of anti-shake parameter IS, the value of release state parameter RP, the value of dust-removal state parameter GP, the value of dust-removal time parameter CNT, and channel parameter CH.

Anti-shake parameter IS indicates whether the photographing apparatus 1 is in the anti-shake mode. When the anti-shake parameter IS equals one, the photographing apparatus is in the anti-shake mode; when it equals zero, the photographing apparatus 1 is not in the anti-shake mode.

The value of the release state parameter RP changes with respect to the release sequence operation. When the release sequence operation is performed, the value of the release state parameter RP is set to one (refer to steps S24 to S31 in FIG. 4); and when the release sequence operation is finished, the value of the release state parameter RP is set (reset) to zero (refer to steps S13 and S32 in FIG. 4).

The dust-removal state parameter GP indicates whether the dust-removal operation is finished. The value of the dust-removal state parameter GP is set to one because the dust-removal operation may be considered underway from the moment immediately after the photographing apparatus 1 is set to the ON state until the first time period (220 ms) has elapsed (refer to step S14 in FIG. 4).

Figure 4:
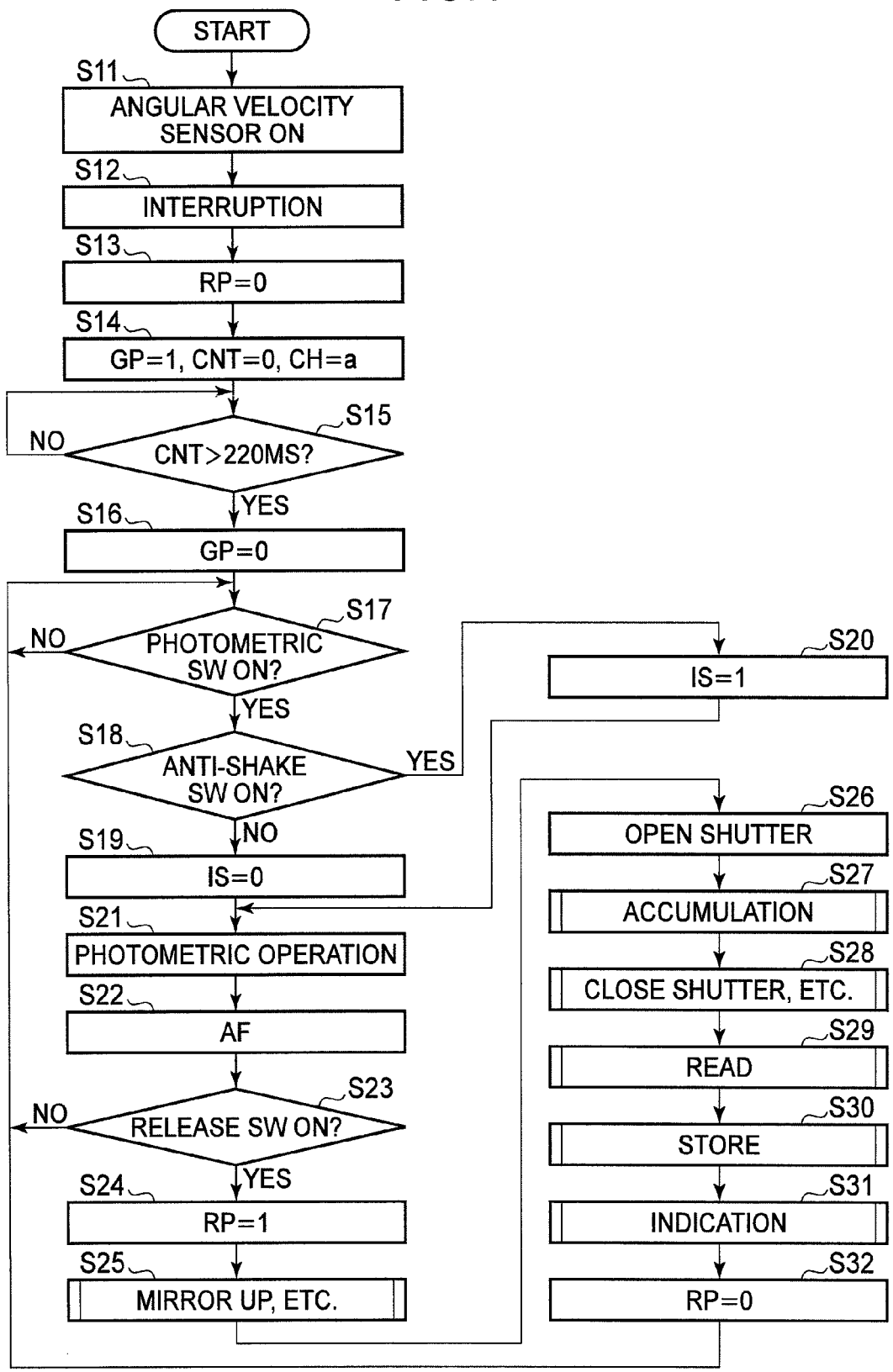
FIG. 4 is a flowchart showing a main process of the image-capturing device.

The value of the dust-removal state parameter GP is set to zero because the dust-removal operation may be considered to be finished from the moment when the first time period (220 ms) has elapsed after the photographing apparatus 1 is set to the ON state (refer to step S16 in FIG. 4).

The dust-removal time parameter CNT is used for measuring the length of time the dust-removal operation is underway. An initial value of the dust-removal time parameter CNT is set to zero. While the dust-removal operation is being performed, the value of the dust-removal time parameter CNT is increased by one at every time interval of 1 ms (refer to step S701 in FIG. 6).

The channel parameter CH indicates that trajectory of the dust-removal process in which the movable part 30a is.

It is set according to the number of times that the movable part 30a has been driven in alphabetical order by a. The value "a" of the channel parameter CH indicates that the movable part 30a is in the "a" trajectory.

The CPU 21 moves the movable part 30a to a predetermined initial position in the dust-removal operation before the anti-shake operation. This operation is named the centering operation (refer to step S84 in FIG. 7). In this embodiment, the predetermined position is the center of the movement range (where the coordinate values in the x-direction and in the y-direction are both 0).

Then, the CPU 21 moves the movable part 30a in the y-direction to strike against one side of the boundary of the movable range of the movable part 30a while keeping the movable part 30a at the center of the x-direction. Next, the CPU 21 moves the movable part 30a in the opposite direction to strike against the other side of the boundary of the movable range of the movable part 30a while keeping while keeping the movable part 30a at the center of the x-direction. Finally, the CPU 21 moves the movable part 30a again in the y-direction to strike against one side of the boundary of said movable range while keeping the movable part 30a at the center of the x-direction. The dust particles on the imaging unit 39a of the movable part 30a (the image sensor and the low-pass filter) are removed by the shock of the impact of the movable part 30a against the boundary of said movable range. After the dust-removal operation is completed, the anti-shake operation begins.

Next, the CPU 21 stores the values of a first digital angular velocity signal $Vx_n$, a second digital angular velocity signal $Vy_n$, a first digital angular velocity $VVx_n$, a second digital angular velocity $VVy_n$, a digital displacement angle $Bx_n$, a second digital displacement angle $By_n$, the coordinate of position $S_n$ in the x-direction, $Sx_n$; the coordinate of position $S_n$ in the y-direction, $Sy_n$; the first driving force, $Dx_n$; the second driving force, $Dy_n$; the coordinate of position $P_n$ after A/D conversion in the x-direction, $pdx_n$; the coordinate of position $P_n$ after A/D conversion in the y-direction, $pdy_n$; a first subtraction value, $ex_n$; a second subtraction value, $ey_n$; a first proportional coefficient, Kx; a second proportional coefficient, Ky; a sampling cycle θ of the anti-shake operation; a first integral coefficient, Tix; a second integral coefficient, Tiy; a first differential coefficient, Tdx; and a second differential coefficient, Tdy.

The AE unit 23 (an exposure calculating unit) performs the photometric operation and calculates the photometric values, based on the subject being photographed. The AE unit 23 also calculates the aperture value and the duration of the exposure, with respect to the photometric values, both of which are needed for imaging. The AF unit 24 performs the AF-sensing operation and the corresponding focusing operation, both of which are needed for imaging. In the focusing operation, the camera lens 67 is moved along the optical axis LX.

The anti-shake part (the anti-shake apparatus) of the photographing apparatus 1 comprises an anti-shake button 14, an anti-shake switch 14a, an LCD monitor 17, a CPU 21, an angular velocity detection unit 25, a driver circuit 29, an anti-shake unit 30, a hall-element signal-processing unit 45 (a magnetic-field change-detecting element), and the camera lens 67.

When the anti-shake button 14 is depressed by the operator, the anti-shake switch 14a is set to the ON state. When the anti-shake switch 14a is in the ON state, the photographing apparatus 1 is in the anti-shake mode, and the anti-shake parameter IS is set to zero (IS=1). When the anti-shake switch 14a is not in the ON state, the photographing apparatus 1 is in the non-anti-shake mode, and the anti-shake parameter IS is set to zero (IS=0). In the anti-shake mode, the anti-shake operation is executed. In the anti-shake operation, the angular velocity detection unit 25 and the anti-shake unit 30 are driven for each the second time independent with the other operation, for example, the photometry operation. In this embodiment, the value of the predetermined time interval is set to 1 ms.

The CPU 21 controls the various output commands corresponding to the input signals of these switches. The port P12 of the CPU 21 receives a 1-bit digital signal indicating whether the photometric switch 12a is in the ON state or the OFF state. The port P13 of the CPU 21 receives a 1-bit digital signal indicating whether the release switch 13a is in the ON state or the OFF state. The port P14 of the CPU 21 receives a 1-bit digital signal indicating whether the anti-shake switch 14a is in the ON state or the OFF state. The AE unit 23, the AF unit 24, and the LCD monitor 17 are respectively connected to port P4, P5 and P6 of the CPU 21 for I/O.

Next, the details of the angular velocity detection unit 25, the driver circuit 29, the anti-shake unit 30, and the hall-element signal-processing unit 45 are described.

The angular velocity detection unit 25 has a first angular velocity sensor 26a, a second angular velocity sensor 26b, a first high-pass filter circuit 27a, a second high-pass filter circuit 27b, a first amplifier 28a and a second amplifier 28b.

The first angular velocity sensor 26a detects the angular velocity of a rotary motion (the yawing) of the photographing apparatus 1 about the axis of the y-direction, i.e., it detects the velocity component in the x-direction of the angular velocity of the photographing apparatus 1. The first angular velocity sensor 26a is a gyro sensor that detects the yaw angular velocity.

The second angular velocity sensor 26b detects the angular velocity of a rotary motion (the pitch) of the photographing apparatus 1 about the axis of the x-direction i.e., detects the velocity component in the y-direction of the angular velocity of the photographing apparatus 1. The second angular velocity sensor 26b is a gyro sensor that detects a pitch angular velocity.

The first high-pass filter circuit 27a reduces a low-frequency component of the signal output from the first angular velocity sensor 26a, because the low-frequency component of the signal output from the first angular velocity sensor 26a includes signal elements that are based on a null voltage and panning motion, neither of which are related to camera-shake. The second high-pass filter circuit 27b reduces a low-frequency component of the signal output from the second angular velocity sensor 26b, because the low-frequency component of the signal output from the second angular velocity sensor 26b includes signal elements that are based on a null voltage and panning motion, neither of which are related to camera-shake. The processes performed by the first and second high-pass filter circuit 27a and 27b are analog high-pass filter processes.

The first amplifier 28a amplifies a signal related to the yawing angular velocity, whose low-frequency component has been reduced, and outputs the analog signal to the port A/D0 of the CPU 21 as a first angular velocity vx. The second amplifier 28b amplifies a signal relating to the pitch angular velocity, whose low-frequency component has been reduced, and outputs the analog signal to the port A/D1 of the CPU 21 as a second angular velocity vy.

The reduction of the low-frequency signal component is a two-step process; the primary part of the analog high-pass filter process is performed first by the first and second high-pass filter circuits 27a, 27b, followed by the secondary part of the digital high-pass filter process that is performed by the CPU 21. The cut-off frequency of the secondary part of the digital high-pass filter process is higher than that of the primary part of the analog high-pass filter process. In the digital high-pass filter process, the value of a time constant (a first high-pass filter time constant hx and a second high-pass filter time constant hy) can be easily changed.

The supply of electrical power to the CPU 21 and each part of the angular velocity detection unit 25 begins after the power switch 11a is set to the ON state (the main power supply is set to the ON state). The calculation of a camera-shake value begins after the power switch 11a is set to the ON state and the dust-removal operation is finished.

The CPU 21 converts the first and second angular velocities vx and vy, which are respectively input to the ports A/D0 and A/D1, to a first and second digital angular velocity signals $Vx_n$ and $Vy_n$. It then calculates first and second digital angular velocities $VVx_n$ and $VVy_n$ by reducing a low-frequency components of the first and second digital angular velocity signals $Vx_n$ and $Vy_n$ (the digital high-pass filter process) because the low-frequency component of the first and second digital angular velocity signals $Vx_n$ and $Vy_n$ include signal elements that are based on a null voltage and panning motion, neither of which are related to camera-shake. Moreover, it calculates a camera-shake displacement angle (the first and second digital displacement angles $Bx_n$ and $By_n$) by integrating the first and second digital angular velocities $VVx_n$ and $VVy_n$ (the integration process).

The CPU 21 and the angular velocity detection unit 25 use a function to calculate the camera-shake value.

"n" is an integer greater than zero and indicates the length of time (ms) from the commencement of the timer interruption process, (t=0 ; refer to step S12 in FIG. 4), to the point when the latest anti-shake operation is performed (t=n).

In the digital high-pass filter process regarding the x-direction, the first digital angular velocity $VVx_n$ is calculated by dividing the summation of the first digital angular velocity $VVx_0$ to $VVx_{n-1}$ (calculated by the timer interruption process before the 1 ms predetermined time interval; i.e., before the latest anti-shake operation was performed), by the first high-pass filter time constant hx, and then subtracting the resulting quotient from the first digital angular velocity signal $Vx_n$ ($VVx_n=Vx_n-(\Sigma VVx_{n-1})\div hx$). In the digital high-pass filter process regarding the y-direction, the second digital angular velocity $VVy_n$ is calculated analogously to $VVx_n$ to give ($VVy_n=Vy_n-(\Sigma VVy_{n-1})\div hy$).

In this embodiment, the angular velocity detection operation in (a portion of) the timer interruption process includes the processing by the angular velocity detection unit 25 and the process of inputting the first and second angular velocities vx and vy from the angular velocity detection unit 25 to the CPU 21.

In the integration process regarding the x-direction, the first digital displacement angle $Bx_n$ is calculated by the summation from the first digital angular velocity $VVx_0$ at the point when the timer interruption process commences (t=0) (refer to step S12 in FIG. 4) to the first digital angular velocity $VVx_n$ at the point when the latest anti-shake operation is performed (t=n; $Bx_n=\Sigma VVx_n$).

Similarly, in the integration process regarding the y-direction, the second digital displacement angle $By_n$ is calculated by the summation from the second digital angular velocity $VVy_0$ at the point when the timer interruption process commences to the second digital angular velocity $VVy_n$ at the point when the latest anti-shake operation is performed ($By_n=\Sigma VVy_n$).

The CPU 21 calculates the position $S_n$ where the imaging unit 39a (the movable part 30a) should be moved, corresponding to the camera-shake value (the first and second digital displacement angles $Bx_n$ and $By_n$) that is calculated for the x-direction and the y-direction on the basis of a position conversion coefficient zz (a first position conversion coefficient zx for the x-direction and a second position conversion coefficient zy for the y-direction).

The coordinate of position $S_n$ in the x-direction is defined as $Sx_n$, and in the y-direction as $Sy_n$. The movement of the movable part 30a, which includes the imaging unit 39a, is performed using electromagnetic force, and is described later.

The driving force $D_n$ drives the driver circuit 29 in order to move the movable part 30a to the position $S_n$. The coordinate of the driving force $D_n$ in the x-direction is defined as the first driving force $Dx_n$ (after D/A conversion: a first PWM duty dx). The coordinate of the driving force $D_n$ in the y-direction is defined as the second driving force $Dy_n$ (after D/A conversion: a second PWM duty dy).

The first PWM duty dx is the duty ratio of the driving pulse corresponding to the first driving force $Dx_n$. The second PWM duty dy is the duty ratio of the driving pulse corresponding to the second driving force $Dy_n$.

The value of second driving force $Dy_n$ is represented by +DD or −DD. +DD indicates that the movable part 30a is driven in the positive y-direction, i.e., towards the upper end of the fixed part 30b. −DD indicates that the movable part 30a is driven in the negative y-direction, i.e., towards the bottom end of the fixed part 30b.

Figure 6:
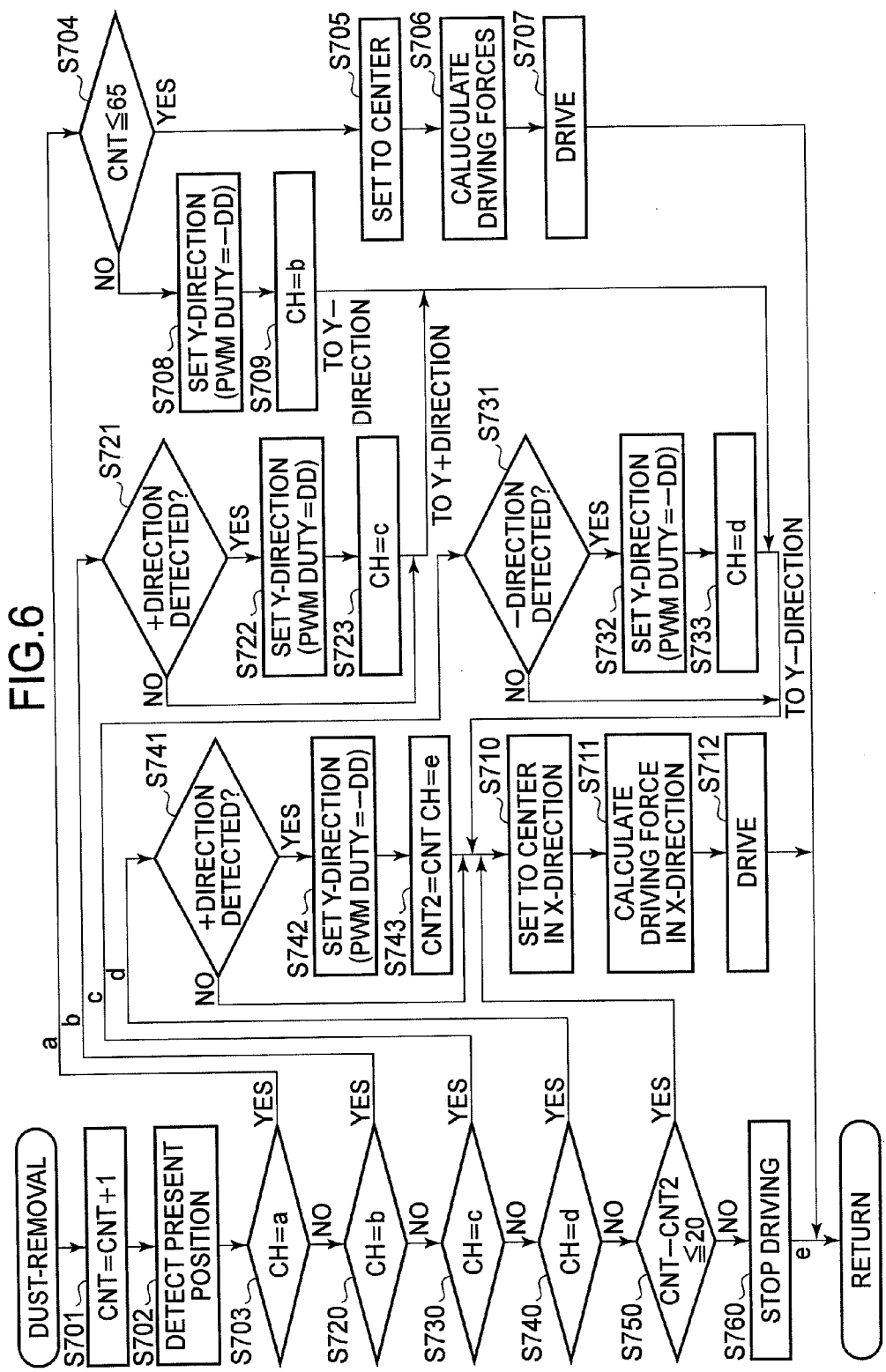
FIG. 6 is a flowchart showing a dust-removal process.

However, the position $S_n$, where the imaging unit 39a (the movable part 30a) should be moved in the first time period (220 ms) for the dust-removal operation before the anti-shake operation is performed, is set to a value that does not correspond to the camera-shake value (refer to step S705 in FIG. 6).

For example, the position $S_n$ is set on the center of the fixed part 30b in the "a" trajectory of the dust-removal operation. Therefore, the movable part 30a is set on the center of the fixed part 30b. In the "b" to "d" trajectories of the dust-removal operation, the position $S_n$ is set the farthest from its present position from among the top and bottom of the fixed part 30b. Thus, the movable part 30a is moved towards the top or bottom of the fixed part 30b, and strikes it.

In a positioning operation regarding the x-direction, the coordinate of position $S_n$ in the x-direction is defined as $Sx_n$, and is the product of the latest first digital displacement angle $Bx_n$ and the first position conversion coefficient zx ($Sx_n = zx \times Bx_n$).

In a positioning operation regarding the y-direction, the coordinate of position $S_n$ in the y-direction is defined as $Sy_n$, and is the product of the latest second digital displacement angle $By_n$ and the second position conversion coefficient zy ($Sy_n = zy \times By_n$).

The anti-shake unit 30 corrects for the camera-shake by moving the imaging unit 39a to the position $S_n$, by canceling the shake of the photographing subject image on the imaging surface of the image sensor of the imaging unit 39a, and by stabilizing the photographing subject image displayed on the imaging surface of the image sensor during the exposure time when the anti-shake operation is performed (IS=1).

The anti-shake unit 30 has a fixed part 30b that forms the boundary of the movement range of the movable part 30a, and the movable part 30a which includes the imaging unit 39a and can be moved on the xy plane. The movement range is wider than a shake-correction area in which the movable part 30a is moved during the anti-shake operation.

During the exposure time when the anti-shake operation is not performed (IS=0), the movable part 30a is fixed to (held in) the predetermined position. The predetermined position is the center of the movement range.

In the first time period (220 ms), after the photographing apparatus 1 is set to the ON state, the movable part 30a is driven to the predetermined position that is the center of the movement range. Next, the movable part 30a is driven against the boundary of the movement range in the y-direction.

Otherwise (except for the first time period and the exposure time), the movable part 30a is not driven.

The anti-shake unit 30 does not have a fixed-positioning mechanism that maintains it in a fixed position when it is not being driven (i.e., the drive OFF state).

The driving of the movable part 30a of the anti-shake unit 30, including the movement to a predetermined fixed position, is performed by the electromagnetic force of the coil and magnetic units for driving, by action of the driver circuit 29 which has first PWM duty dx input from the PWM0 of the CPU 21 and second PWM duty dy input from the PWM1 of the CPU 21.

The position $P_n$ of the movable part 30a, either before or after the movement effected by the driver circuit 29, is detected by the hall element 44a and the hall-element signal-processing unit 45.

Information regarding the first coordinate of the detected position $P_n$ in the x-direction, in other words the first detected position signal px, is input to the A/D converter A/D2 of the CPU 21 (refer to (2) in FIG. 6). px is an analog signal that is converted to a digital signal by the A/D converter A/D2 (A/D conversion). Through the A/D conversion, analog px becomes digital $pdx_n$.

Similarly, regarding the y-direction, py is input to the A/D converter A/D3 of the CPU 21. Through the A/D conversion, analog py is becomes digital $pdy_n$.

The PID (Proportional Integral Differential) control procedure calculates the first and second driving forces $Dx_n$ and $Dy_n$ on the basis of the coordinate data for the detected position $P_n$ ($pdx_n$, $pdy_n$) and the position $S_n$ ($Sx_n$, $Sy_n$) following movement.

The calculation of the first driving force $Dx_n$ is based on the first subtraction value $ex_n$, the first proportional coefficient Kx, the sampling cycle θ, the first integral coefficient Tix, and the first differential coefficient Tdx ($Dx_n = Kx \times \{ex_n + \theta \div Tix \times \Sigma ex_n + Tdx \div \theta \times (ex_n - ex_{n-1})\}$). The first subtraction value $ex_n$ is calculated by subtracting the first coordinate of the detected position $P_n$ in the x-direction after the A/D conversion, $pdx_n$, from the coordinate of position $S_n$ in the x-direction, $Sx_n$ ($ex_n = Sx_n - pdx_n$).

The calculation of the second driving force $Dy_n$ is based on the second subtraction value $ey_n$, the second proportional coefficient Ky, the sampling cycle θ, the second integral coefficient Tiy, and the second differential coefficient Tdy ($Dy_n = Ky \times \{ey_n + \theta \div Tiy \times \Sigma ey_n + Tdy \div \theta \times (ey_n - ey_{n-1})\}$). The second subtraction value $ey_n$ is calculated by subtracting the second coordinate of the detected position $P_n$ in the y-direction after the A/D conversion, $pdy_n$, from the coordinate of position $S_n$ in the y-direction, $Sy_n$ ($ey_n = Sy_n - pdy_n$).

The value of the sampling cycle θ is set to the predetermined time interval of 1 ms.

The movable part 30a is driven to the position $S_n$, ($Sx_n$, $Sy_n$) by the anti-shake operation of the PID control procedure, when the photographing apparatus 1 is set to the anti-shake mode (IS=1) by the setting of the anti-shake switch 14a to the ON state.

When the anti-shake parameter IS is zero the PID control procedure not corresponding to the anti-shake operation is performed so that the movable part 30a is moved to the center of the movement range (the predetermined position).

In the dust-removal operation, from the point when the photographing apparatus 1 is set to the ON state until the anti-shake operation commences, the movable part 30a is first moved to the center of the movement range, then moved to one side of the boundary of the movement range in the y-direction (the primary collision), then moved to the opposite side of the boundary of the movement range in the y-direction (the secondary collision), then moved again to the original side of the boundary of the movement range in the y-direction (the final collision), in order. During this period, the x-coordinate of the movable part 30a is held constant at the center.

The movable part 30a has a coil unit for driving that is comprised of a first driving coil 31a and a second driving coil 32a, an imaging unit 39a that has the image sensor, and a hall element 44a acting as a magnetic-field change-detecting element. In the first embodiment, the image sensor is a CCD; however, the image sensor may be another image sensor such as a CMOS etc.

A rectangular form of the imaging surface of the image sensor has two sides parallel to the x-direction and two sides parallel to the y-direction that are shorter than those of the x-direction.

Accordingly, the movement range of the movable part 30a in the x-direction is greater than in the y-direction.

The fixed part 30b has a magnetic unit for driving that is comprised of a first position-detecting and driving magnet 411b, a second position-detecting and driving magnet 412b, a first position-detecting and driving yoke 431b, and a second position-detecting and driving yoke 432b.

The fixed part 30b movably supports the movable part 30a in the x-direction and in the y-direction.

The fixed part 30b has a buffer member that absorbs the shock at the point of contact with the movable part 30a (at the boundary of the movement range).

The hardness of the buffer member is chosen such that the part making contact, such as the movable part 30a, is not damaged by the shock of the impact, but any dust on the movable part 30a is removed by the shock of the impact with the buffer member.

In the first embodiment, the buffer member is attached to the fixed part 30b; however, the buffer member may be attached to the movable part 30a.

When the movable part 30a is positioned at the center of its movement range in both the x-direction and the y-direction, the center of the image sensor intersects the optical axis LX of the camera lens 67, and the full imaging range of the image sensor may be utilized.

The rectangle shape, which is the form of the imaging surface of the image sensor, has two diagonal lines. In the first embodiment, the center of the image sensor is at the intersection of these two diagonal lines.

The first driving coil 31a, the second driving coil 32a, and the hall element 44a are attached to the movable part 30a.

The first driving coil 31a is formed in a sheet and a spiral and has magnetic field lines in the y-direction, thus creating the first electromagnetic force for moving the movable part 30a which includes the first driving coil 31a, in the x-direction.

The first electromagnetic force occurs on the basis of the current direction of the first driving coil 31a and the magnetic-field direction of the first position-detecting and driving magnet 411b.

The second driving coil 32a is formed in a sheet and a spiral and has magnetic field lines in the y-direction, thus creating the first electromagnetic force for moving the movable part 30a which includes the first driving coil 32a, in the y-direction.

The second electromagnetic force occurs on the basis of the current direction of the second driving coil 32a and the magnetic-field direction of the second position-detecting and driving magnet 412b.

The first and second driving coils 31a and 32a are connected to the driver circuit 29 which drives the first and second driving coils 31a and 32a through a flexible circuit board (not depicted). The first PWM duty dx is input to the driver circuit 29 from the PWM0 of the CPU 21, and the second PWM duty dy is input to the driver circuit 29 from the PWM1 of the CPU 21. The driver circuit 29 supplies power to the first driving coil 31a corresponding to the value of the first PWM duty dx, and to the second driving coil 32a that corresponding to the value of the second PWM duty dy, in order to drive the movable part 30a.

The first position-detecting and driving magnet 411b is attached to the movable part side of the fixed part 30b, where the first position-detecting and driving magnet 411b faces the first driving coil 31a and the horizontal hall element hh10 in the z-direction.

The second position-detecting and driving magnet 412b is attached to the movable part side of the fixed part 30b, where the second position-detecting and driving magnet 412b faces the second driving coil 32a and the vertical hall element hv10 in the z-direction.

The first position-detecting and driving magnet 411b is attached to the first position-detecting and driving yoke 431b, under the condition where the N pole and S pole are arranged in the x-direction. The first position-detecting and driving yoke 431b is attached to the fixed part 30b on the side of the movable part 30a in the z-direction.

The second position-detecting and driving magnet 412b is attached to the second position-detecting and driving yoke 432b, under the condition where the N pole and S pole are arranged in the y-direction. The second position-detecting and driving yoke 432b is attached to the fixed part 30b on the side of the movable part 30a in the z-direction.

The first and second position-detecting and driving yokes, 431b and 432b, are made of a soft, magnetic material.

The first position-detecting and driving yoke 431b prevents the magnetic-field of the first position-detecting and driving magnet 411b from dissipating to the surroundings, and raises the magnetic-flux density between the first position-detecting and driving magnet 411b and the first driving coil 31a, and between the first position-detecting and driving magnet 411b and the horizontal hall element hh10.

The second position-detecting and driving yoke 432b prevents the magnetic-field of the second position-detecting and driving magnet 412b from dissipating to the surroundings, and raises the magnetic-flux density between the second position-detecting and driving magnet 412b and the second driving coil 32a, and between the second position-detecting and driving magnet 412b and the vertical hall element hv10.

The hall element 44a is a single-axis unit that contains two magneto-electric converting elements (magnetic-field change-detecting elements) utilizing the Hall Effect to detect the first detected position signal px and the second detected position signal py specifying the first coordinate in the x-direction and the second coordinate in the y-direction, respectively, of the present position $P_n$ of the movable part 30a.

One of the two hall elements is a horizontal hall element hh10 for detecting the first coordinate of the position $P_n$ of the movable part 30a in the x-direction, and the other is a vertical hall element hv10 for detecting the second coordinate of the position $P_n$ of the movable part 30a in the y-direction.

The horizontal hall element hh10 is attached to the movable part 30a where the horizontal hall element hh10 faces the first position-detecting and driving magnet 411b of the fixed part 30b in the z-direction.

The vertical hall element hv10 is attached to the movable part 30a where the vertical hall element hv10 faces the second position-detecting and driving magnet 412b of the fixed part 30b in the z-direction.

When the center of the image sensor is intersecting the optical axis LX, it is desirable to have the horizontal hall element hh10 positioned on the hall element 44a facing an intermediate area between the N pole and S pole of the first position-detecting and driving magnet 411b in the x-direction, as viewed from the z-direction. In this position, the horizontal hall element hh10 utilizes the maximum range in which an accurate position-detecting operation can be performed based on the linear output change (linearity) of the single-axis hall element.

Similarly, when the center of the image sensor intersects the optical axis LX, it is desirable to have the vertical hall element hv10 positioned on the hall element 44a facing an intermediate area between the N pole and S pole of the second position-detecting and driving magnet 412b in the y-direction, as viewed from the z-direction.

The hall-element signal-processing unit 45 has a first hall-element signal-processing circuit 450 and a second hall-element signal-processing circuit 460.

The first hall-element signal-processing circuit 450 detects a horizontal potential difference x10 between the output terminals of the horizontal hall element hh10 that is based on an output signal of the horizontal hall element hh10.

The first hall-element signal-processing circuit 450 outputs the first detected position signal px, which specifies the first coordinate of the position $P_n$ of the movable part 30a in the x-direction, to the A/D converter A/D2 of the CPU 21, on the basis of the horizontal potential difference x10.

The second hall-element signal-processing circuit 460 detects a vertical potential difference y10 between the output terminals of the vertical hall element hv10 that is based on an output signal of the vertical hall element hv10.

The second hall-element signal-processing circuit 460 outputs the second detected position signal py, which specifies the second coordinate of the position $P_n$ of the movable part 30a in the y-direction, to the A/D converter A/D3 of the CPU 21, on the basis of the vertical potential difference y10.

Next, the main process of the photographing apparatus 1 in the first embodiment is explained using the flowchart of FIG. 4.

When the photographing apparatus 1 is set to the ON state, electrical power is supplied to the angular velocity detection unit 25 so that the angular velocity detection unit 25 is set to the ON state in step S11.

In step S12, the timer interruption process at the predetermined time interval (1 ms) commences. In step S13, the value of the release state parameter RP is set to zero. The detail of the timer interruption process is explained later using the flowchart of FIG. 5.

In step S14, the value of the dust-removal state parameter GP is set to one; the value of the dust-removal time parameter CNT is set to zero; and the channel parameter is set to a.

In step S15, it is determined whether the value of the dust-removal time parameter CNT is greater than 220. Step S15 is provided to wait until the end of the timer interruption process. The dust-removal time parameter CNT is the time that is need so that the timer interruption process is finished. In this embodiment, in consideration of the completion time of the timer interruption process and individual differences in anti-shake units 30, 220 ms is used.

In step S15, it is determined whether the value of the dust-removal time parameter CNT is greater than 220. When it is determined that the value of the dust-removal time parameter CNT is greater than 220, the process continues to step S16; otherwise, the process in step S15 is repeated.

In step S16, the value of the dust-removal state parameter GP is set to 0.

In step S17, it is determined whether the photometric switch 12a is set to the ON state. When it is determined that the photometric switch 12a is set to the ON state, the process continues to step S18; otherwise, the process in step S17 is repeated.

In step S18, it is determined whether the anti-shake switch 14a is set to the ON state. When it is determined that the anti-shake switch 14a is not set to the ON state, the value of the anti-shake parameter IS is set to zero in step S19; otherwise, the value of the anti-shake parameter IS is set to one in step S20.

In step S21, the AE sensor of the AE unit 23 is driven, the photometric operation is performed, and the aperture value and exposure time are calculated.

In step S22, the AF sensor and the lens control circuit of the AF unit are driven to perform the AF sensing and focusing operations, respectively.

In step S23, it is determined whether the release switch 13a is set to the ON state. When the release switch 13a is not set to the ON state, the process returns to step S17 and the process in steps S17 to S22 is repeated; otherwise, the process continues to step S24 and the release-sequence operation commences.

In step S24, the value of the release state parameter RP is set to one. In step S25, the mirror-up operation and the aperture closing operation corresponding to the aperture value that is either preset or calculated, are performed by the mirror-aperture-shutter unit 18.

After the mirror-up operation is finished, the opening operation of the shutter (the movement of the front curtain of the shutter) commences in step S26.

In step S27, the exposure operation, or in other words the electrical charge accumulation of the image sensor (CCD etc.), is performed. After the exposure time has elapsed, the closing operation of the shutter (the movement of the rear curtain of the shutter), the mirror-down operation, and the opening operation of the aperture are performed by the mirror-aperture-shutter unit 18 in step S28.

In step S29, the electrical charge which has accumulated in the image sensor during the exposure time is read. In step S30, the CPU 21 communicates with the DSP 19 so that the imaging process is performed based on the electrical charge read from the image sensor. The image, on which the image process is performed, is stored in the memory of the photographing apparatus 1. In step S31, the image that is stored in the memory is displayed on the LCD monitor 17. In step S32, the value of the release state parameter RP is set to zero, and the release sequence operation is finished. After that, the process then returns to step S17. In other words, the photographing apparatus 1 is set to a state where the next imaging operation can be performed.

Next, the timer interruption process, which commences in step S12 in FIG. 4 and is performed at every 1 ms time interval, is described with reference to the flowchart in FIG. 5.

When the timer interruption process commences, it is determined whether the value of the dust-removal state parameter GP is set to one in step S50. When it is determined that the value of the dust-removal state parameter GP is set to one, the process continues to step S51; otherwise, the process proceeds directly to step S52.

In step S51, the dust-removal process is performed. The detail of the dust-removal process is explained later using the flowchart of FIG. 7.

In step S52, the first angular velocity vx, which is output from the angular velocity detection unit 25, is input to the A/D converter A/D0 of the CPU 21 and converted to the first digital angular velocity signal $Vx_n$. The second angular velocity vy, which is also output from the angular velocity detection unit 25, is input to the A/D converter A/D1 of the CPU 21 and converted to the second digital angular velocity signal $Vy_n$ (the angular velocity detection process).

The low frequencies of the first and second digital angular velocity signals $Vx_n$ and $Vy_n$ are reduced in the digital high-pass filter process (the first and second digital angular velocities $VVx_n$ and $VVy_n$).

In step S53, it is determined whether the value of the release state parameter RP is set to one. When it is determined that the value of the release state parameter RP is not set to one, the driving control of the movable part 30a is set to the OFF state. In other words, the anti-shake unit 30 is set to a state where the driving control of the movable part 30a is not performed in step S54; otherwise, the process proceeds directly to step S55.

In step S55, the hall element 44a detects the position of the movable part 30a, and the first and second detected position signals px and py are calculated by the hall-element signal-processing unit 45. The first detected position signal px is then input to the A/D converter A/D2 of the CPU 21 and converted to a digital signal $pdx_n$, whereas the second detected position signal py is input to the A/D converter A/D3 of the CPU 21 and also converted to a digital signal $pdy_n$, both of which thus determine the present position $P_n$ ($pdx_n$, $pdy_n$) of the movable part 30a.

In step S56, it is determined whether the value of the anti-shake parameter IS is zero. When it is determined that the value of the anti-shake parameter IS is zero, (in other words when the photographing apparatus is not in anti-shake mode), the position $S_n$ ($Sx_n$, $Sy_n$) where the movable part 30a (the imaging unit 39a) should be moved is set to the center of the movement range of the movable part 30a, in step S57. When it is determined that the value of the anti-shake parameter IS is not zero (IS=1), (in other words when the photographing apparatus is in anti-shake mode), the position $S_n$ ($Sx_n$, $Sy_n$) where the movable part 30a (the imaging unit 39a) should be moved is calculated on the basis of the first and second angular velocities vx and vy, in step S58.

In step S59, the first driving force $Dx_n$ (the first PWM duty dx) and the second driving force $Dy_n$ (the second PWM duty dy) of the driving force $D_n$ that moves the movable part 30a to the position $S_n$ are calculated on the basis of the position $S_n$ ($Sx_n$, $Sy_n$) that was determined in step S57 or step S58, and the present position $P_n$ ($pdx_n$, $pdy_n$).

In step S60, the first driving coil unit 31a is driven by applying the first PWM duty dx to the driver circuit 29, and the second driving coil unit 32a is driven by applying the second PWM duty dy to the driver circuit 29, so that the movable part 30a is moved to position $S_n$ ($Sx_n$, $Sy_n$).

The process of steps S59 and S60 is an automatic control calculation that is used with the PID automatic control for performing general proportional, integral, and differential calculations.

Figure 5:
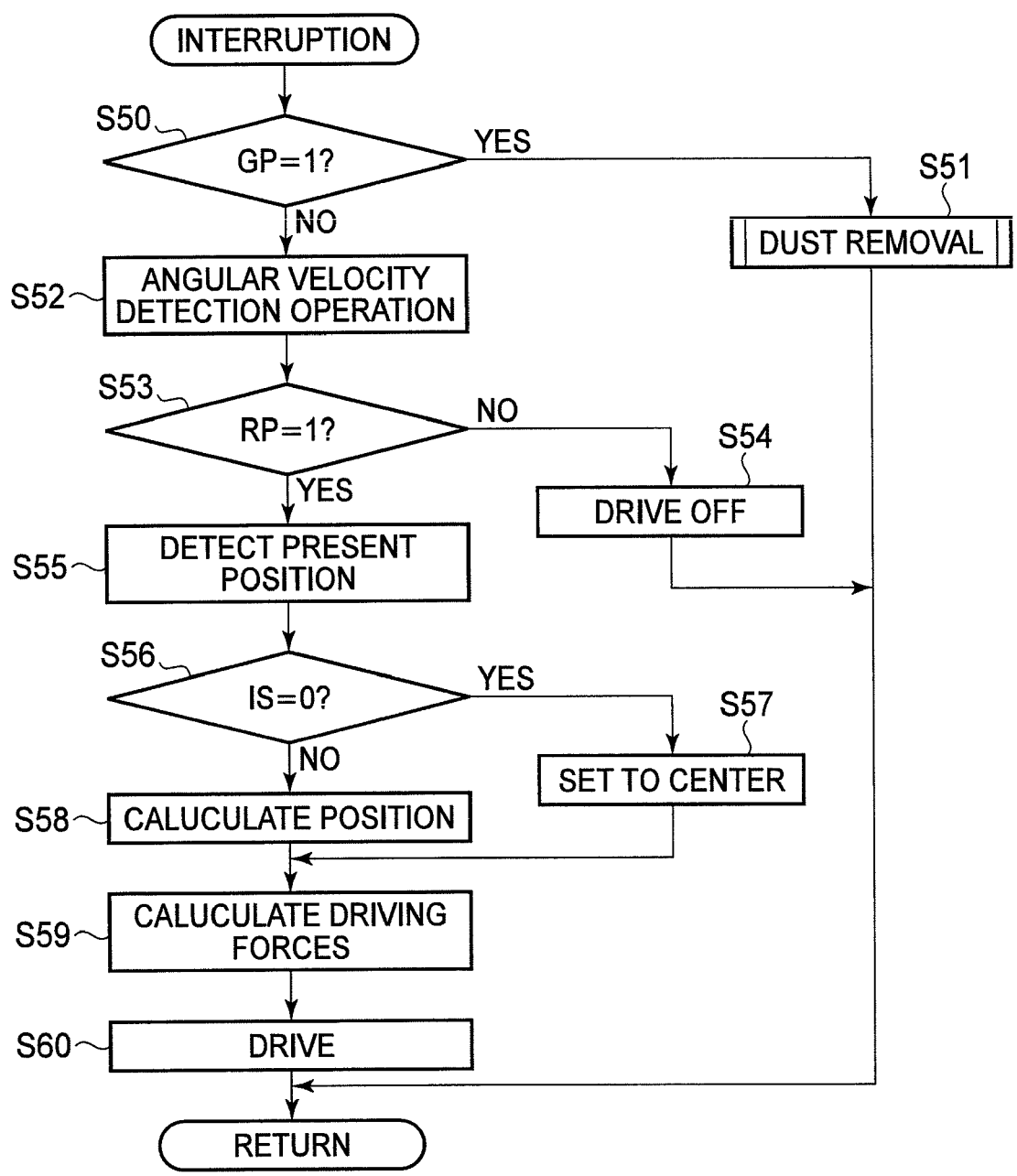
FIG. 5 is a flowchart showing an interrupting process.

Next, the dust-removal process, which commences in step S51 in FIG. 5, is explained using the flowchart in FIGS. 6 to 9.

When the dust-removal process commences, the value of the dust-removal time parameter CNT is increased by one in step S701.

In step S702, the hall element 44a detects the position of the movable part 30a, and the first and second detected position signals px and py are calculated by the hall-element signal-processing unit 45. The first detected position signal px is then input to the A/D converter A/D2 of the CPU 21 and converted to a digital signal $pdx_n$, whereas the second detected position signal py is input to the A/D converter A/D3 of the CPU 21 and also converted to a digital signal $pdy_n$, both of which thus determine the present position $P_n$ ($pdx_n$, $pdy_n$) of the movable part 30a.

In step S703, it is determined whether the value of the channel parameter CH is a or not. The channel parameter is set to a in step S14 of the main process. Thereby, the process proceeds to step S704, and it is determined whether the value of the dust-removal time parameter CNT is less than or equal to sixty-five.

The threshold value of the dust-removal time parameter CNT is calculated by adding the maximum time necessary for movable part 30a to move from its present position to the center of the fixed part 30b, i.e., the time necessary for movable part 30a to move from the corner to the center of the fixed part 30b considering individual differences in anti-shake units 30. Thus, the threshold value is calculated to be sixty-five. When the channel value CH is a and the dust-removal time parameter CNT is less than or equal to sixty-five, the movable part 30a may not yet be in the center of the fixed part 30b. In other words, when the channel value CH is a and the dust-removal time parameter CNT is larger than sixty-five, the movable part 30a is in the center of the fixed part 30b.

In step S704, when the value of the dust-removal time parameter CNT is less than or equal to sixty-five, the process proceeds to step S705.

In step S705, the position $S_n$ ($Sx_n$, $Sy_n$) where the movable part 30a (the imaging unit 39a) should be moved is set to the center of the movement range of the movable part 30a.

In step S706, the driving force $D_n$ that moves the movable part 30a is calculated using the position $S_n$($Sx_n$, $Sy_n$) that was determined in step S705 according to the present position $P_n$ ($pdx_n$, $pdy_n$). This calculation is the same as the one in step S59 in the timer interruption process.

In step S707, the movable part 30a is moved by executing the same process as in step S60 in the timer interruption process. Then, the dust-removal process ends, and the process returns to the timer interruption process (subroutine return).

The timer interruption process is repeatedly executed for each one millisecond (the second time). Therefore, the dust-removal process is also repeatedly executed until the dust-removal state parameter GP is set to zero in step S16 of the main process.

When the dust-removal process commences again, the value of the dust-removal time parameter CNT is increased by one, making it two, in step S701. Then, steps S702 and S703 are executed. At this point, the process proceeds to step S704, because the channel value CH is still a.

In step S704, it is determined whether the value of the dust-removal time parameter CNT is less than or equal to sixty-five. The channel parameter is set to a in step S14 as described before, so that the process proceeds to step S705 and ends through steps S706 and S707 (subroutine return). Then, the dust-removal process is executed again in the timer interruption process.

Steps S701 to S707 are repeatedly executed until the dust-removal time parameter CNT becomes larger than sixty-five. In the case that the dust-removal time parameter CNT becomes larger than sixty-five in step S704, the process proceeds to step S708. Note that the movable part 30a is placed in the center of the fixed part 30b.

In step S708, the value of the second PWM duty dy is set to −DD. The value DD, i.e., the absolute value |+DD| and |−DD| is set so that the acceleration of the movable part 30a at the point in time when the movable part 30a is moved to and struck against the boundary of the movement range of the movable part 30a is increased to the degree where the dust on the movable part 30a can be removed by the shock of the impact.

In step S82, the value of the second PWM duty dy is set to +DD.

In step S709, the value of the channel parameter CH is set to b. The value b indicates that the movable part 30a is in the b trajectory. Note that the value of the channel parameter CH is set to b at this time as a matter of convenience, while the movable part 30a is in the a trajectory in FIG. 7 at this time. Then, the process proceeds to step S710.

In step S710, the coordinate of position $S_n$ in the x-direction, $Sx_n$, where the movable part 30a should be moved in the x-direction, is set to the center of the movement range of the movable part 30a in the x-direction.

In step S711, the first driving force $Dx_n$ (the first PWM duty dx) is calculated on the basis of the coordinate of position $S_n$ in the x-direction, $Sx_n$, determined in step S710, and the coordinate of the present position $P_n$ in the x-direction, $pdx_n$. The first driving force $Dx_n$, i.e., the driving force $D_n$ which moves the movable part 30a in the x-direction, is needed to move the movable part 30a by providing signals to the first driving coil unit 31a.

In step S712, the first driving coil unit 31a is driven by applying the first PWM duty dx calculated in step S80, to the driver circuit 29, and the second driving coil unit 32a is driven by applying the second PWM duty dy to the driver circuit 29, so that the movable part 30a is moved. The movable part 30a is moved towards the center of the movable range along the x-direction, and moved towards the bottom of the fixed part 30b, i.e., along the negative y-direction. After that, the process ends, and the dust-removal process is executed again in the timer interruption process.

When the dust-removal process commences again, the value of the dust-removal time parameter CNT is increased by one so as to become sixty-six, in step S701. Then, steps S702, S703, and s720 are executed. At this point, the process proceeds to step S721, because the channel value CH is b.

In step S721, the movement direction of the movable part 30a is calculated by the CPU 21. The CPU 21 detects the displacement of the movable part 30a in the y-direction so that the movement direction of the movable part 30a is detected. The displacement is measured by the CPU 21 using the output signals from the vertical hall element hv10. In the last step S712, the movable part 30a begins to move towards the bottom of the fixed part 30b. In the case that the movement of the movable part 30a is in the negative y-direction, i.e., towards the bottom of the fixed part 30b, the CPU 21 can determine that the movable part 30a is moving towards the bottom of the fixed part 30b. Therefore, steps S722 and S723 are not executed and the value of the second PWM duty dy is kept at −DD which is set in step S708. Then, in step S712, the movable part 30a is moved in the negative y-direction, i.e., the direction towards the bottom of the fixed part 30b. After that, the process ends, and the dust-removal process is executed again in the timer interruption process. Repeating these processes, the movable part 30a strikes the bottom of the fixed part 30b (refer to FIG. 7).

When the movable part 30a strikes the bottom of the fixed part 30b, the movable part 30a bounces by the impact. Therefore, the movement direction of the movable part 30a changes to the positive y-direction, i.e., the direction towards the top of the fixed part 30b. As the dust-removal process is executed, it is determined whether the movement of the movable part 30a is in the positive y-direction, i.e., the direction towards the top of the fixed part 30b or not in step S721. The CPU 21 registers the displacement of the movable part 30a in the y-direction. The displacement is measured by the CPU 21 from the output signals from the vertical hall element hv10. In the case that the movement of the movable part 30a is in the positive y-direction, steps S722 and S723 are executed because the CPU 21 can determine that the movable part 30a strikes the bottom of the fixed part 30b and bounces.

In the case that the movement direction of the movable part 30a is the positive y-direction in step S721, the value of the second PWM duty dy is kept to +DD in step S722. As described hereinbefore, +DD indicates that the movable part 30a has moved in the positive y-direction, i.e. the direction towards the top of the fixed part 30b.

In the next step S723, the value of the channel parameter CH is set to c. The value c indicates that the movable part 30a is in the c trajectory in FIG. 7. The movable part 30a which is bounced by the impact is in the c trajectory in FIG. 7. Then, the process proceeds to step S710, and steps S710 to S711 are executed as previously described.

In step S712, voltage is applied through the driver circuit 29 to the first driving coil unit 31a according to the first PWM duty dx, and voltage is applied through the driver circuit 29 to the second driving coil unit 32a according to the second PWM duty dy, so that the movable part 30a is moved. In the case that it is decided that the movable part 30a is moved towards the top of the fixed part 30b in step S721, the movable part 30a is moved in the positive y-direction, i.e., towards the top of the fixed part 30b in step S712. The acceleration of the movable part 30a is calculated by adding the acceleration created by the movable part 30a bouncing from the bottom of the fixed part 30b in step S712 and the acceleration created by the process in step S721. In other words, the acceleration of the movable part 30a is calculated by adding two accelerations in the same direction (refer to FIGS. 7 and 8). Therefore, the movable part 30a is moved in the y-direction by an acceleration larger than the acceleration created by the second driving coil unit 32a alone. Note that the movable part 30a is fixed at the center of the movable range in the x-direction by processing steps S710 to S712 (refer to FIG. 9). After that, the process ends, and the dust-removal process is executed again in the timer interruption process.

When the dust-removal process commences again, the value of the dust-removal time parameter CNT is increased by one in step S701 and the present position $P_n(pdx_n, pdy_n)$ is calculated in step S702. The channel value CH is c at this point, so that the process proceeds to step S731 if it is determined that CH equals c in step S730.

In step S731, the movement direction of the movable part 30a is detected by the CPU 21. In the last step S712, the movable part 30a begins to move towards the top of the fixed part 30b. In the case that the movement of the movable part 30a is in the positive y-direction, i.e., the direction towards the top of the fixed part 30b, the CPU 21 can determine that the movable part 30a is moving towards the top of the fixed part 30b. Therefore, steps S732 and S733 are not executed and the value of the second PWM duty dy is kept to +DD which is set in step S722.

Then, in step S712, the movable part 30a is moved in the positive y-direction, i.e., the direction towards the top of the fixed part 30b. After that, the process ends, and the dust-removal process is executed again in the timer interruption process. Repeating these processes, the movable part 30a strikes the top of the fixed part 30b (refer to FIG. 7).

When the movable part 30a strikes the top of the fixed part 30b, it bounces by the impact. Therefore, the movement direction of the movable part 30a changes to the negative y-direction, i.e., the direction towards the bottom of the fixed part 30b.

As the dust-removal process is executed, it is determined whether the movement direction of the movable part 30a is the negative y-direction or not in step S731.

In the case that the movement of the movable part 30a is in the negative y-direction, the CPU 21 can determine that the movable part 30a strikes the top of the fixed part 30b and bounces. Therefore, steps S732 and S733 are executed.

In the case that the movement of the movable part 30a is in the negative y-direction in step S731, the value of the second PWM duty dy is kept to −DD in step S732. As described hereinbefore, '1DD indicates that the movable part 30a is moved in the negative y-direction, i.e., the direction towards the bottom of the fixed part 30b.

In the next step S723, the value of the channel parameter CH is set to d. The value d indicates that the movable part 30a is in the d trajectory in FIG. 7. Therefore, the movable part 30a which bounces from the impact is in the d trajectory in FIG. 7 at this point. Then, the process proceeds to step S710, and steps S710 to S711 are executed as described previously.

In the next step S712, voltage is applied to the first driving coil unit 31a according to the first PWM duty dx through the driver circuit 29, and voltage is applied to the second driving coil unit 32a according to the second PWM duty dy through the driver circuit 29, so that the movable part 30a is moved. In the case that it is decided that the movable part 30a is moved towards the bottom of the fixed part 30b in step S731, the movable part 30a is moved in the negative y-direction, i.e., towards the bottom of the fixed part 30b in step S712.

The acceleration of the movable part 30a is calculated by adding the acceleration created by the movable part 30a bouncing from the top of the fixed part 30*b* in step S712 and the acceleration created by the process in step S721. In other words, the acceleration of the movable part 30*a* is calculated by adding two accelerations in the same direction (refer to FIG. 7). Therefore, the movable part 30*a* is moved in the y-direction by an acceleration larger than the acceleration created by the second driving coil unit 32*a* alone.

After that, the process ends, and the dust-removal process is executed again in the timer interruption process.

When the dust-removal process commences again, the value of the dust-removal time parameter CNT is increased by one in step S701. The process proceeds to step S741 through step S740, because the channel value CH is d at this point.

In step S741, the movement direction of the movable part 30*a* is detected by the CPU 21. In the last step S712, the movable part 30*a* begins to move towards the bottom of the fixed part 30*b*. In the case that the movement direction of the movable part 30*a* is the negative y-direction, i.e., the direction towards the bottom of the fixed part 30*b*, the CPU 21 can determine that the movable part 30*a* is moving towards the bottom of the fixed part 30*b*. Therefore, steps S742 and S743 are not executed and the value of the second PWM duty dy is kept to −DD which is set in step S732.

Then, in step S712, the movable part 30*a* is moved in the negative y-direction, i.e., the direction towards the bottom of the fixed part 30*b*. After that, the process ends, and the dust-removal process is executed again in the timer interruption process. Repeating these processes, the movable part 30*a* strikes the bottom of the fixed part 30*b* (refer to FIG. 7).

When the movable part 30*a* strikes the bottom of the fixed part 30*b*, the movable part 30*a* bounces from the impact. Therefore, the movement direction of the movable part 30*a* changes to the positive y-direction, i.e., the direction towards the top of the fixed part 30*b*.

As the dust-removal process is executed, it is determined whether the movement direction of the movable part 30*a* is the positive y-direction, i.e., i.e., the direction towards the top of the fixed part 30*b* or not in step S741.

In the case that the movement direction of the movable part 30*a* is the positive y-direction, the CPU 21 can determine that the movable part 30*a* strikes the bottom of the fixed part 30*b* and bounces. Therefore, steps S742 and S743 are executed.

In the case that the movement direction of the movable part 30*a* is the top of the fixed part 30*b* in step S741, the value of the second PWM duty dy is kept to +DD in step S742.

In the next step S743, the value of the channel parameter CH is set to e. The second dust-removal time parameter CNT2 is substituted by the present dust-removal time parameter CNT.

Figure 7:
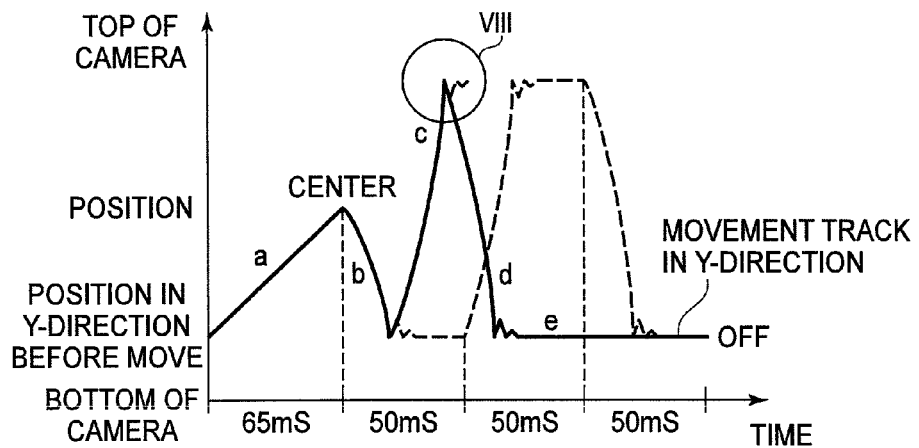
FIG. 7 shows the trajectory of the movable part in the y-direction during the dust-removal process.
Figure 8:
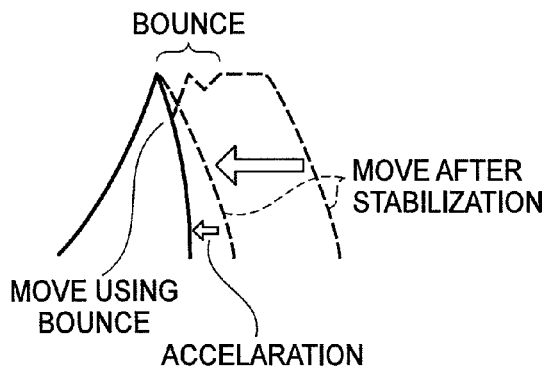
FIG. 8 is an enlarged view of the circled area VIII of FIG. 7.
Figure 9:
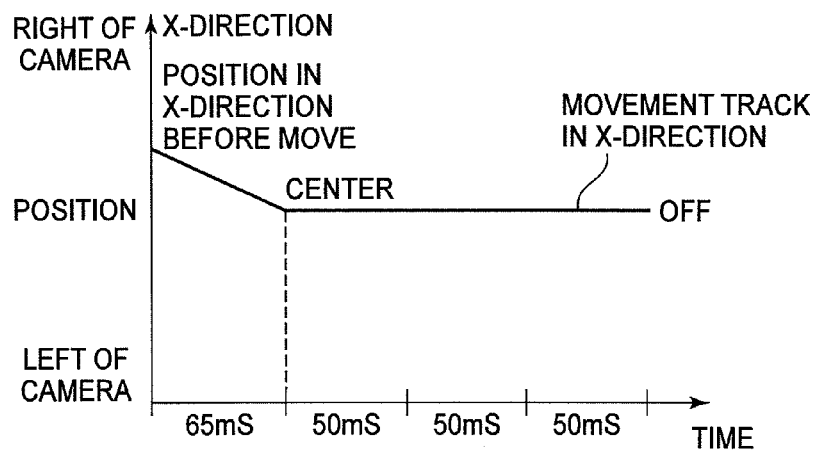
FIG. 9 shows the trajectory of the movable part in the x-direction in the dust-removal process.

The value e indicates that the movable part 30*a* is in the e trajectory in FIG. 7. Therefore, the movable part 30*a* which bounces from the impact is in the e trajectory in FIG. 7 at this point. Then, the process proceeds to step S710, and steps S710 to S711 are executed as described previously.

In the next step S712, voltage is applied to the first driving coil unit 31*a* according to the first PWM duty dx through the driver circuit 29, and voltage is applied to the second driving coil unit 32*a* according to the second PWM duty dy through the driver circuit 29, so that the movable part 30*a* is moved. It is determined that the movable part 30*a* is moved towards the top of the fixed part 30*b* in step S741, the movable part 30*a* is moved in the negative y-direction, i.e., towards the bottom of the fixed part 30*b* in step S712. Note that the acceleration of the movable part 30*a* is calculated by adding the acceleration created by the movable part 30*a* bouncing from the bottom of the fixed part 30*b* in the last step S712 and the acceleration created by the process in step S721. In other words, the acceleration of the movable part 30*a* is calculated by adding two accelerations having different directions (refer to FIG. 7). Therefore, the speed of the movable part 30*a* is reduced so that the bounce of the movable part 30*a* off the bottom of the fixed part 30*b* is damped.

After that, the process ends, and the dust-removal process is executed again in the timer interruption process.

When the dust-removal process commences again, the value of the dust-removal time parameter CNT is increased by one, in step S701. At this point, the process proceeds to step S750, because the channel value CH is e.

In step S750, it is determined whether the value that reduced the dust-removal time parameter CNT from the second dust-removal time parameter CNT2 is less than or equal to twenty. In the case the value is less than or equal to twenty, steps S710 to S712 are executed again so that the movable part 30*a* is moved towards the bottom of the fixed part 30*b*. Then, the process ends and the dust-removal process is executed again in the timer interruption process.

When the dust-removal process commences again, the value of the dust-removal time parameter CNT is increased by one in step S701. Then, steps S702, S703, s720, S730, S740, and S750 are executed. In step S750, it is determined whether the value that reduced the dust-removal time parameter CNT from the second dust-removal time parameter CNT2 is less than or equal to twenty again. In the case the value is larger than twenty, the process proceeds to step S760. The movable part 30*a* is thus held against the bottom of the fixed part 30*b*.

In the next step S760, the movable part 30*a* is in the drive OFF state.

According to this embodiment, the movable part 30*a* is moved using the bounces created by striking with the fixed part 30*b*, so that the movable part 30*a* is moved by an acceleration larger than that created by the second driving coil unit 32*a* alone.

Moreover, conventional image-taking devices may have a delay from the moment that the movable part 30*a* strikes their fixed part 30*b*, until the next movement. This is due to the error compensation required between movement periods as a result of individual differences. According to this embodiment, waiting is not required, so the overall executing time of the dust-removal operation is shortened.

Note that the impact of the movable part 30*a* and the fixed part 30*b* is not limited to three times, it may be any number of times greater than or equal to one. In that case, steps S720 to S723 or steps S730 to S733 are executed according to the number of impacts.

In the dust-removal operation, the movable part 30*a* may be held at the center in the y-direction and moved in the x-direction. The movable range of the movable part 30*a* in the x-direction is longer than that in the y-direction.

Furthermore, the position where the movable part 30*a* is moved to when the dust-removal operation commences is not limited to the center of the movement range of the movable part 30*a*. It may be any position where the movable part 30*a* does not make contact with the boundary of the movement range of the movable part 30*a*.

Moreover, it is explained that the hall element is used for position detection as the magnetic-field change-detecting element. However, another detection element, an MI (Magnetic Impedance) sensor such as a high-frequency carrier-type magnetic-field sensor; a magnetic resonance-type magnetic-field detecting element; or an MR (Magneto-Resistance effect) element may be used for position detection purposes. When one of either the MI sensor, the magnetic resonance-type magnetic-field detecting element, or the MR element is used, the information regarding the position of the movable part 30a can be obtained by detecting the magnetic-field change, similar to using the hall element.

Although the embodiment of the present invention has been described herein with reference to the accompanying drawings, obviously many modifications and changes may be made by those skilled in the art without departing from the scope of the invention.

The present disclosure relates to subject matter contained in Japanese Patent Application No. 2007-326270 (filed on Dec. 18, 2007), which is expressly incorporated herein, by reference, in its entirety.

The invention claimed is:

1. A drive device comprising:
a movable part;
a fixed part that is provided within a movement range of said movable part;
a driver that drives said movable part in a first direction against said fixed part; and
a direction detector that detects a rebound direction of said movable part after said movable part strikes said fixed part;
said driver driving said movable part so as to strike said fixed part according to the rebound direction detected by said direction detector after said movable part strikes said fixed part.

2. The drive device according to claim 1, said driver configured to drive said movable part to a center of the movement range prior to driving said movable part in the first direction against said fixed part.

3. The drive device according to claim 1, said direction detector comprising a magnetic field change detecting element.

4. The drive device according to claim 1, said driver comprising a driving coil and a cooperating driving magnet.

5. The drive device according to claim 1, one of the fixed part and the movable part including buffer members configured to absorb shock upon contact of the movable part with the fixed part.

6. The drive mechanism according to claim 5, said buffer members having a hardness such that the movable part is not damaged by impact with the fixed part and dust on the movable part is removed by impact with the fixed part.

7. The drive mechanism according to claim 1, the direction detector comprising a hall effect element.

8. An image-capturing device comprising:
a drive device having a movable part, a fixed part that is provided within a movement range of said movable part, a driver that drives said movable part in a first direction to strike against said fixed part, and a direction detector that detects a rebound direction of said movable part after said movable part strikes said fixed part, said driver driving said movable part so as to strike said fixed part according to the rebound direction detected by said direction detector after said movable part strikes said fixed part, said fixed part holding an image sensor.

9. The image-capturing device according to claim 8, wherein said driver drives said movable part in the same direction as the rebound direction detected by said direction detector when said movable part strikes said fixed part and rebounds from said fixed part.

10. The image-capturing device according to claim 8, wherein said driver drives said movable part in a first direction, then against the first direction so that said movable part strikes said fixed part.

11. The image-capturing device according to claim 8, wherein said fixed part comprises a frame part which is provided in the first direction, said movable part configured to strike the frame part.

12. The image-capturing device according to claim 8, wherein said driver is configured to drive said movable part in a second direction which is isolated from the first direction on the imaging surface of the image sensor, and said driver comprises a shake corrector which corrects shake of said image sensor by driving said movable part in the first and second directions within a shake-correction area, said fixed part being provided outside the shake-correction area, said movable part striking said fixed part beyond the shake-correction area.

13. The image-capturing device according to claim 8, wherein an imaging area of the image sensor is covered by a cover, and dust particles attached to an outer surface of the cover are removed by an impact caused by striking said fixed part with said movable part.

14. The image capturing device according to claim 8, said driver configured to drive said movable part to a center of the movement range prior to driving said movable part in the first direction against said fixed part.

15. The image capturing device according to claim 8, said direction detector comprising a magnetic field change detecting element.

16. The image capturing device according to claim 8, said driver comprising a driving coil and a cooperating driving magnet.

17. The image capturing device according to claim 8, one of the fixed part and the movable part including buffer members configured to absorb shock upon contact of the movable part with the fixed part.

18. The image capturing device according to claim 17, said buffer members having a hardness such that the movable part is not damaged by impact with the fixed part and dust on the movable part is removed by impact with the fixed part.

19. The image capturing device according to claim 8, the direction detector comprising a hall effect element.

* * * * *